(12) United States Patent
Kano et al.

(10) Patent No.: US 7,399,552 B2
(45) Date of Patent: Jul. 15, 2008

(54) BATTERY

(75) Inventors: Gentaro Kano, Fukushima (JP); Karin Tsuda, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/919,949

(22) Filed: Aug. 17, 2004

(65) Prior Publication Data

US 2005/0058904 A1 Mar. 17, 2005

(30) Foreign Application Priority Data

Aug. 21, 2003 (JP) .............................. 2003-297067

(51) Int. Cl.
*H01M 4/58* (2006.01)
*H01M 4/48* (2006.01)

(52) U.S. Cl. ............ 429/231.4; 429/231.6; 429/231.95; 429/231.9

(58) Field of Classification Search ............... 429/231.4, 429/231.8, 231.95, 231.9
See application file for complete search history.

(56) References Cited

U.S. PATENT DOCUMENTS

| 5,426,006 A * | 6/1995 | Delnick et al. ............... 429/221 |
| 5,482,790 A | 1/1996 | Yamada et al. |
| 6,136,474 A | 10/2000 | Kihura et al. |
| 6,521,380 B1 * | 2/2003 | Ryu et al. ................. 429/231.8 |
| 6,632,569 B1 * | 10/2003 | Kameda et al. .......... 429/231.8 |
| 6,884,546 B1 | 4/2005 | Fujita et al. |

FOREIGN PATENT DOCUMENTS

| EP | 0 267 791 A2 | 5/1988 |
| EP | 1 005 097 A1 | 5/2000 |
| EP | 1 403 944 A1 | 3/2004 |
| JP | 2003-173778 A | 6/2003 |
| WO | WO 02/093666 A1 | 11/2002 |

* cited by examiner

*Primary Examiner*—Patrick Joseph Ryan
*Assistant Examiner*—Angela J. Martin
(74) *Attorney, Agent, or Firm*—Robert J. Depke; Rockey, Depke & Lyons, LLC.

(57) ABSTRACT

Provided is a battery capable of improving charge-discharge cycle characteristics. The battery comprises a spirally wound electrode body in which a cathode and an anode are spirally wound with a separator in between. The capacity of the anode includes a capacity component by insertion and extraction of Li and a capacity component by precipitation and dissolution of Li metal, and is represented by the sum of them. Moreover, the anode includes a carbon material capable of obtaining a first peak within a range from 1580 $cm^{-1}$ to 1620 $cm^{-1}$ and a second peak within a range of 1350 $cm^{-1}$ to 1370 $cm^{-1}$ in a Raman spectrum analysis using argon laser light with a wavelength of 5145 nm, and having an intensity ratio IB/IA between the first peak and the second peak of 0.25 to 0.6, where the intensity of the first peak is IA and the intensity of the second peak is IB. Thereby, precipitation-dissolution efficiency of lithium metal and charge-discharge cycle characteristics can be improved.

12 Claims, 3 Drawing Sheets

BATTERY

BACKGROUND OF THE INVENTION

1. Field of the Invention

The present invention relates to a battery comprising a cathode, an anode and an electrolyte wherein the capacity of the anode includes a capacity component by insertion and extraction of light metal and a capacity component by precipitation and dissolution of the light metal, and is represented by the sum of them.

2. Description of the Related Art

The development of batteries with a higher energy density has been required according to the downsizing of electronic devices. An example of a secondary battery which can obtain a high energy density is a lithium-ion secondary battery using a material capable of inserting and extracting lithium (Li) such as a carbon material for an anode. The lithium-ion secondary battery is designed so that lithium inserted into an anode material is always in an ion state, so the energy density is highly dependent on the number of lithium ions capable of being inserted into the anode material. Therefore, in the lithium-ion secondary battery, it is expected that when the amount of insertion of lithium is increased, the energy density can be further improved. However, the amount of insertion of graphite, which is considered at present to be a material capable of the most effectively inserting and extracting lithium ions is theoretically limited to 372 mAh per gram on an electricity amount basis, and recently the amount of insertion of graphite has been approaching the limit.

Another example of the secondary battery capable of obtaining a high energy density is a lithium metal secondary battery using lithium metal for an anode, and using only precipitation and dissolution reactions of lithium metal for an anode reaction. The lithium metal has a theoretical electrochemical equivalent of 2054 mAh/cm$^3$, which is 2.5 times larger than that of graphite used in the lithium-ion secondary battery, so the lithium metal secondary battery has the potential to be able to obtain a much higher energy density than the lithium-ion secondary battery. A large number of researchers have been conducting research and development aimed at putting the lithium metal secondary battery to practical use (for example, Lithium Batteries edited by Jean-Paul Gabano, Academic Press, 1983, London, New-York). However, the lithium metal secondary battery has a problem that when a charge-discharge cycle is repeated, a large decline in its discharge capacity occurs, so it is difficult to put the lithium metal secondary battery to practical use. The decline in the capacity occurs because the lithium metal secondary battery uses precipitation-dissolution reactions of the lithium metal in the anode. It is considered that the decline occurs because the precipitated lithium metal is separated from an electrode, or reacts with an electrolyte solution, thereby the lithium metal secondary battery is deactivated.

Therefore, the applicant of the invention have developed a novel secondary battery in which the capacity of the anode includes a capacity component by insertion and extraction of lithium and a capacity component by precipitation and dissolution of lithium metal, and is represented by the sum of them (refer to International Publication No. WO 01/22519). In the secondary battery, a carbon material capable of inserting and extracting lithium ions is used for the anode, and lithium metal is precipitated on a surface of the carbon material during charge. The secondary battery holds promise of improving charge-discharge cycle characteristics while achieving a higher energy density.

However, like the lithium metal secondary battery, the secondary battery uses precipitation-dissolution reactions of lithium, so it is extremely difficult to perfectly prevent separation of the lithium metal from the electrode or a reaction of the lithium metal with the electrolyte solution. Therefore, the secondary battery has a problem that when a charge-discharge cycle is repeated, a larger decline in the discharge capacity occurs, compared to the lithium-ion secondary battery.

SUMMARY OF THE INVENTION

In view of the foregoing, it is an object of the invention to provide a battery capable of improving charge-discharge cycle characteristics.

A battery according to the invention comprises: a cathode; an anode; and an electrolyte, wherein the capacity of the anode includes a capacity component by insertion and extraction of light metal and a capacity component by precipitation and dissolution of the light metal, and is represented by the sum of them, and the anode includes a carbon material capable of obtaining a first peak within a range from 1580 cm$^{-1}$ to 1620 cm$^{-1}$ and a second peak within a range of 1350 cm$^{-1}$ to 1370 cm$^{-1}$ in a Raman spectrum analysis using argon laser light with a wavelength of 5145 nm, and the carbon material having an intensity ratio IB/IA between the first peak and the second peak of 0.25 to 0.6, where the intensity of the first peak is IA and the intensity of the second peak is IB.

In the battery according to the invention, the anode includes a carbon material capable of obtaining the first peak within a range from 1580 cm$^{-1}$ to 1620 cm$^{-1}$ and the second peak within a range of 1350 cm$^{-1}$ to 1370 cm$^{-1}$ in a Raman spectrum analysis using argon laser light with a wavelength of 5145 nm, and having an intensity ratio IB/IA between the first peak and the second peak of 0.25 to 0.6, that is, a carbon material including a graphitic structure and a disordered structure at a predetermined ratio, so light metal ions can be sufficiently inserted into the anode on the basis of the graphitic structure, and the precipitation of light metal can be adjusted on the basis of the disordered structure, and a reaction between light metal and the electrolyte and the separation of light metal from the carbon material can be prevented, thereby precipitation-dissolution efficiency of light metal, that is, charge-discharge efficiency can be improved. Therefore, a higher capacity can be obtained, and charge-discharge cycle characteristics can be improved.

Other and further objects, features and advantages of the invention will appear more fully from the following description.

DETAILED DESCRIPTION OF THE PREFERRED EMBODIMENTS

A preferred embodiment of the invention will be described in more detail below referring to the accompanying drawings.

Figure 1:
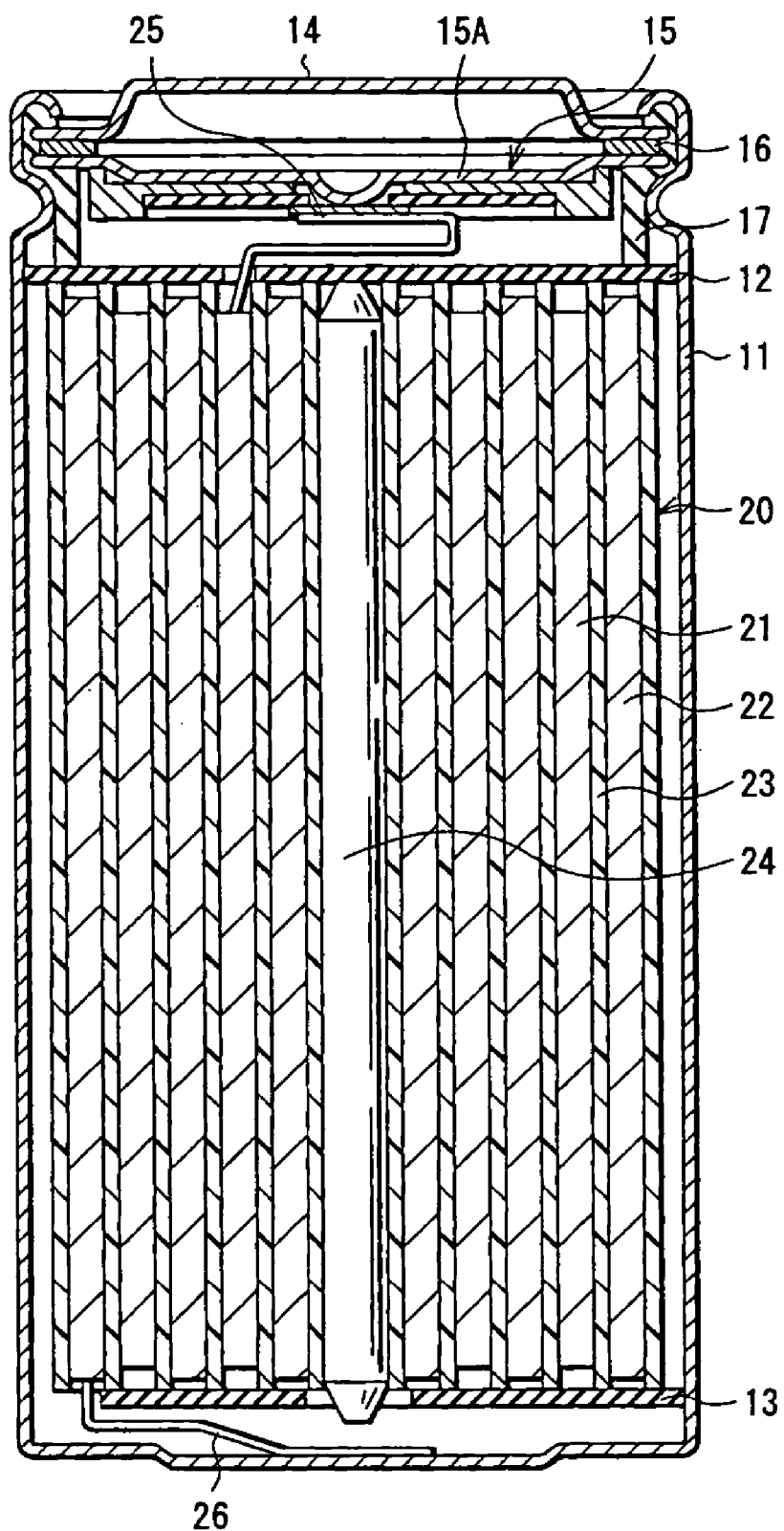
FIG. 1 is a sectional view of a secondary battery according to an embodiment of the invention.

In a secondary battery according to an embodiment of the invention, during charge, lithium ions are precipitated as lithium metal while the lithium ions are inserted into an anode, and during discharge, lithium metal is dissolved while lithium ions are extracted from the anode. FIG. 1 shows an example of the secondary battery. The secondary battery shown in FIG. 1 is a so-called cylindrical type, and comprises a spirally wound electrode body 20 including a strip-shaped cathode 21 and a strip-shaped anode 22 spirally wound with a separator 23 in between in a substantially hollow cylindrical-shaped battery can 11. The battery can 11 is made of, for example, nickel (Ni)-plated iron (Fe). An end portion of the battery can 11 is closed, and the other end portion thereof is opened. An electrolyte solution which is a liquid electrolyte is injected into the battery can 11 to impregnate the separator 23 with the electrolyte solution. Moreover, a pair of insulating plates 12 and 13 are disposed so that the spirally wound electrode body 20 is sandwiched therebetween in a direction perpendicular to a peripheral winding surface.

In the opened end portion of the battery can 11, a battery cover 14 and, a safety valve mechanism 15 and a PTC device (positive temperature coefficient device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current. The gasket 17 is made of, for example, an insulating material, and its surface is coated with asphalt.

For example, a center pin 24 is inserted into the center of the spirally wound electrode body 20. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
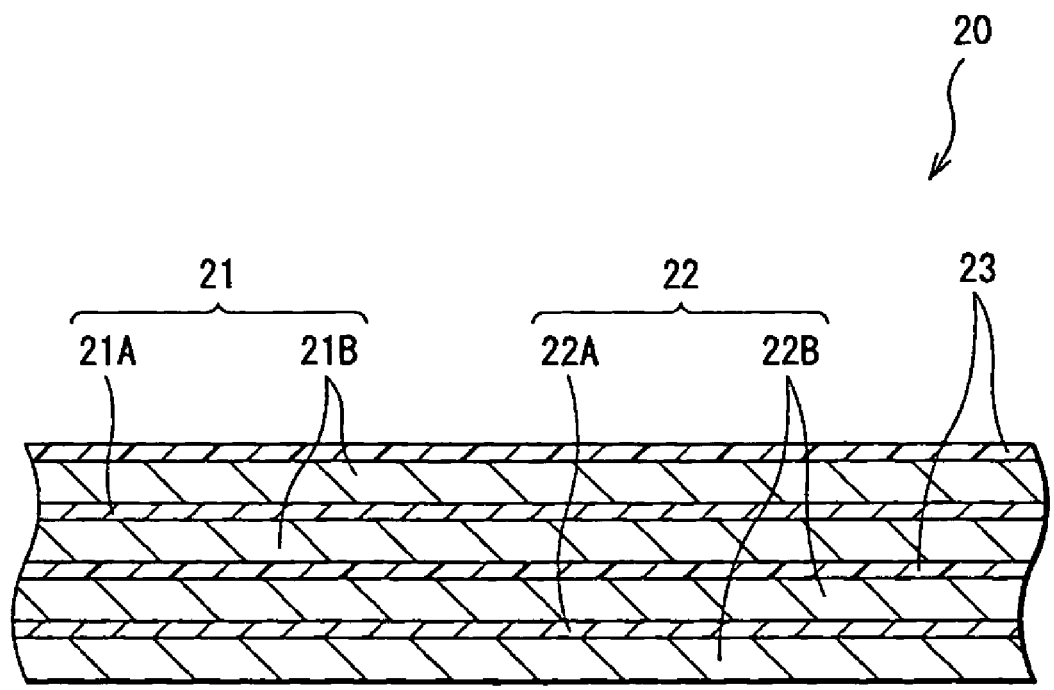
FIG. 2 is an enlarged sectional view of a part of a spirally wound electrode body shown in FIG. 1.

FIG. 2 shows an enlarged view of a part of the spirally wound electrode body 20 shown in FIG. 1. The cathode 21 includes, for example, a cathode current collector 21A having a pair of surfaces facing each other and a cathode mixture layer 21B which is disposed on either side or both sides of the cathode current collector 21A. The cathode current collector 21A is made of, for example, metal foil such as aluminum foil. The cathode mixture layer 21B includes, for example, one kind or two or more kinds of cathode materials capable of inserting and extracting lithium which is light metal. The cathode material capable of inserting and extracting lithium functions as a cathode active material.

As the cathode material capable of inserting and extracting lithium, for example, a lithium-containing compound such as lithium oxide, lithium sulfide, or an intercalation compound including lithium is suitable. More specifically, in order to achieve a higher energy density, lithium complex oxide represented by a general formula $Li_xMO_2$ or an intercalation compound including lithium is preferable. In the formula, as M, one or more kinds of transition metals is preferable, and more specifically at least one kind selected from the group consisting of cobalt (Co), nickel, manganese (Mn), iron, aluminum, vanadium (V) and titanium (Ti) is preferable. The value of x depends upon a charge-discharge state of the battery, and is generally within a range of $0.05 \leq x \leq 1.10$. In addition, manganese spinel ($LiMn_2O_4$) having a spinel crystal structure, lithium iron phosphate ($LiFePO_4$) having an olivine crystal structure, or the like is preferable, because a higher energy density can be obtained.

The cathode mixture layer 21B includes, for example, an electrical conductor, and may further include a binder, if necessary. Examples of the electrical conductor include carbon materials such as graphite, carbon black and ketjen black. In addition to the carbon materials, any electrically conductive material such as a metal material or an electrically conductive high molecular weight material may be used. As the electrical conductor, one kind or a mixture including two or more kinds selected from them may be used. Examples of the binder include synthetic rubber such as styrene butadiene rubber, fluorine rubber or ethylene propylene diene rubber and a high molecular weight material such as polyvinylidene fluoride, and one kind or a mixture including two or more kinds selected from them is used.

The anode 22 includes, for example, an anode current collector 22A having a pair of surfaces facing each other and an anode mixture layer 22B which is disposed on either side or both sides of the anode current collector 22A. The anode current collector 22A is made of, for example, metal foil such as copper (Cu) foil, nickel foil or stainless foil.

The anode mixture layer 22B includes one kind or two or more kinds of anode materials capable of inserting and extracting lithium which is light metal, and may further include, for example, the same binder as that included in the cathode mixture layer 21B, if necessary. The anode material capable of inserting and extracting lithium functions as an anode active material as well as a base material where lithium metal is precipitated during charge.

In the description, insertion and extraction of light metal mean that light metal ions are electrochemically inserted and extracted without losing their ionicity. It includes not only the case where inserted lithium metal exists in a perfect ion state but also the case where the inserted lithium metal exists in an imperfect ion state. These cases include, for example, insertion by electrochemical intercalation of light metal ions into graphite. Further, insertion of the light metal into an alloy including an intermetallic compound, or insertion of the light metal by forming an alloy can be included.

In the embodiment, the anode material capable of inserting and extracting lithium includes a carbon material capable of obtaining a first peak within a range from 1580 $cm^{-1}$ to 1620 $cm^{-1}$ and a second peak within a range of 1350 $cm^{-1}$ to 1370 $cm^{-1}$ in a Raman spectrum analysis using argon laser light with a wavelength of 5145 nm, and having an intensity ratio IB/IA between the first peak and the second peak of 0.25 to 0.6 where the intensity of the first peak is IA and the intensity of the second peak IB. The first peak is called G-band derived from a graphitic structure, and the second peak is called D-band derived from a disordered structure. In other words, the carbon material has the graphitic structure and the disordered structure at a predetermined ratio.

In the secondary battery, as such a carbon material is included, lithium ions can be sufficiently inserted into the anode 22 on the basis of the graphitic structure, and the precipitation of the lithium metal can be adjusted on the basis of the disordered structure, thereby a reaction between the lithium metal and the electrolyte solution and the separation of the lithium metal from the carbon material can be prevented, and the precipitation-dissolution efficiency of the lithium metal, that is, charge-discharge efficiency can be improved. Moreover, the intensity ratio IB/IA of the carbon material is within a range of 0.25 to 0.6, so the effects can be sufficiently obtained.

The disordered structure preferably exists in at least a portion of the surface of the carbon material, because the precipitation of the lithium metal can be sufficiently adjusted. As such a carbon material, a carbon material including a high crystalline layer with an intensity ratio IB/IA of less than 0.25 and a low crystalline layer with an intensity ratio IB/IA of 0.25 or more with which at least a portion of the high crystalline layer is covered, and having an average intensity ratio IB/IA of 0.25 or more as the whole carbon material is cited. More specifically, a carbon material in which after the surfaces of natural graphite particles which becomes the high crystalline layer are covered with a carbon precursor dissolved in and diluted with a solvent, they are fired at a temperature causing no graphitization under an inert atmosphere, for example, at a temperature ranging 700° C. to 2800° C. so as to form the low crystalline layer is cited.

As the carbon precursor, for example, coal tar pitch from soft pitch to hard pitch, carbon-derived heavy oil such as coal liquefied oil, straight-run heavy oil such as asphaltene, petroleum-derived heavy oil such as cracked heavy oil, for example, naphtha tar which is a by-product of thermally cracking crude oil, naphtha or the like, heat-treated pitch which can be obtained by heat treatment of cracked heavy oil such as ethylene tar pitch, fluid catalytic cracking (FCC) decant oil or Ashland pitch can be used. Moreover, vinyl-based macromolecule such as polyvinyl chloride, polyvinyl acetate, polyvinyl butyral or polyvinyl alcohol, a substituted phenolic resin such as a 3-methyl phenol formaldehyde resin or a 3,5-dimethyl phenol formaldehyde resin, aromatic hydrocarbon such as acenaphthylene, decacyclene or anthracene, a cyclic nitrogen compound such as phenazine or acridine, and a cyclic sulfur compound such as thiophene can be used. Further, a natural macromolecule such as cellulose, an acyclic vinyl resin such as polyvinylidene chloride or polyacrylonitrile, an aromatic macromolecule such as polyphenylene, a thermosetting resin such as a furfuryl alcohol resin, a phenol formaldehyde resin or an imide resin, or a thermosetting resin material such as furfuryl alcohol can be used.

As the carbon material having a disordered structure in at least a portion the surface, artificial graphite such as mesocarbon microbead is cited in addition to the above materials.

The anode mixture layer 22B may include any other anode material capable of inserting and extracting lithium in addition to the above carbon material. As the anode material, a carbon material with an intensity ratio IB/IA of less than 0.25 or larger than 0.6 is cited. Moreover, a metal element or a metalloid element capable of forming an alloy with lithium, or an alloy of the metal element or the metalloid element, or a compound of the metal element or the metalloid element is cited. They are preferable because a high energy density can be obtained. In the description, the alloy means not only an alloy including two or more kinds of metal elements but also an alloy including one or more kinds of metal elements and one or more kinds of metalloid elements. As the composition of the alloy, a solid solution, a eutectic (eutectic mixture), an intermetallic compound or the coexistence of two or more kinds selected from them is cited.

Examples of the metal element or the metalloid element capable of forming an alloy with lithium include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). As an alloy or a compound thereof, for example, an alloy or a compound represented by a chemical formula $Ma_sMb_{tu}$ is cited. In the chemical formula, Ma represents at least one kind selected from metal elements and metalloid elements which can form an alloy with lithium, and Mb represents at least one kind selected from elements except for Ma. Further, the values of s and t are $s>0$ and $t \geqq 0$.

Among them, a Group 14 metal element or a Group 14 metalloid element in the long form of the periodic table of the elements, or an alloy thereof or a compound thereof is preferable, and silicon or tin, or an alloy thereof or a compound thereof is more preferable. They may have a crystalline structure or an amorphous structure.

Specific examples of such an alloy or such a compound include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v \leqq 2$), $SnO_w$ ($0<w \leqq 2$), $SnSiO_3$, LiSiO, LiSiO and the like.

Moreover, in the secondary battery, during charge, precipitation of lithium metal on the anode 22 begins at a point where an open circuit voltage (that is, battery voltage) is lower than an overcharge voltage. In other words, in a state where the open circuit voltage is lower than the overcharge voltage, the lithium metal is precipitated on the anode 22, so the capacity of the anode 22 includes a capacity component by insertion and extraction of lithium and a capacity component by precipitation and dissolution of lithium metal, and is represented by the sum of them. Therefore, in the secondary battery, both of the anode material capable of inserting and extracting lithium and the lithium metal have a function as an anode active material, and the anode material capable of inserting and extracting lithium is a base material when the lithium metal is precipitated.

The overcharge voltage means an open circuit voltage when the battery is overcharged, and indicates, for example, a voltage higher than the open circuit voltage of a battery "fully charged" described in and defined by "Guideline for safety assessment of lithium secondary batteries" (SBA G1101) which is one of guidelines drawn up by Japan Storage Battery industries Incorporated (Battery Association of Japan). In other words, the overcharge voltage indicates a higher voltage than an open circuit voltage after charge by using a charging method used when a nominal capacity of each battery is determined, a standard charging method or a recommended charging method. More specifically, the secondary battery is fully charged, for example, at an open circuit voltage of 4.2 V, and the lithium metal is precipitated on a surface of the anode material capable of inserting and extracting lithium in a part of the range of the open circuit voltage from 0 V to 4.2 V.

Thereby, in the secondary battery, a higher energy density can be obtained, and charge-discharge cycle characteristics and high-speed charge characteristics can be improved, because of the following reason. The secondary battery is equivalent to a conventional lithium metal secondary battery using lithium metal or a lithium alloy for the anode in a sense that the lithium metal is precipitated on the anode 22. However, in the secondary battery, the lithium metal is precipitated on the anode material capable of inserting and extracting lithium, thereby it is considered that the secondary battery has the following advantages.

Firstly, in the conventional lithium metal secondary battery, it is difficult to uniformly precipitate the lithium metal, which causes degradation in charge-discharge cycle characteristics; however, the anode material capable of inserting and extracting lithium generally has a large surface area, so in the secondary battery, the lithium metal can be uniformly precipitated. Secondly, in the conventional lithium metal secondary battery, a change in volume according to precipitation and dissolution of the lithium metal is large, which also causes degradation in the charge-discharge cycle characteristics; however, in the secondary battery, the lithium metal is precipitated in gaps between particles of the anode material capable of inserting and extracting lithium, so a change in volume is small. Thirdly, in the conventional lithium metal secondary battery, the larger the amount of precipitation and dissolution of the lithium metal is, the bigger the above problem becomes; however, in the secondary battery, insertion and extraction of lithium by the anode material capable of inserting and extracting lithium contributes to a charge-discharge capacity, so in spite of a large battery capacity, the amount of precipitation and dissolution of the lithium metal is small. Fourthly, when the conventional lithium metal secondary battery is quickly charged, the lithium metal is more nonuniformly precipitated, so the charge-discharge cycle characteristics are further degraded. However, in the secondary battery, in an initial charge, lithium is inserted into the anode material capable of inserting and extracting lithium, so the secondary battery can be quickly charged.

In order to more effectively obtain these advantages, for example, it is preferable that at the maximum voltage before the open circuit voltage becomes an overcharge voltage, the maximum capacity of the lithium metal precipitated on the anode 22 is from 0.05 times to 3.0 times larger than the charge capacity of the anode material capable of inserting and extracting lithium. When the amount of precipitation of the lithium metal is too large, the same problem as that which occurs in the conventional lithium metal secondary battery arises, and when the amount is too small, the charge-discharge capacity cannot be sufficiently increased. Moreover, for example, the discharge capacity of the anode material capable of inserting and extracting lithium is preferably 150 mAh/g or more. The larger the ability to insert and extract lithium is, the smaller the amount of precipitation of the lithium metal relatively becomes. In addition, the charge capacity of the anode material is determined by the quantity of electricity when the battery with the anode made of the anode material as an anode active material and the lithium metal as a counter electrode is charged by a constant-current constant-voltage method until reaching 0 V. For example, the discharge capacity of the anode material is determined by the quantity of electricity when the battery is subsequently discharged for 10 hours or more by a constant-current method until reaching 2.5 V.

The separator 23 isolates between the cathode 21 and the anode 22 so as to pass lithium ions through while preventing a short circuit of a current due to contact between the cathode 21 and the anode 22. The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated. Among them, a porous film made of polyolefin is preferably used, because by use of the porous film, a short circuit can be effectively prevented, and the safety of the battery can be improved by a shutdown effect. More specifically, polyethylene can obtain a shutdown effect within a range from 100° C. to 160° C., and is superior in electrochemical stability, so polyethylene is preferably used as the material of the separator 23. Moreover, polypropylene is also preferably used, and any other resin having chemical stability can be used by copolymerizing or blending with polyethylene or polypropylene.

The electrolyte solution with which the separator 23 is impregnated includes a liquid solvent, for example, a nonaqueous solvent such as an organic solvent, and an electrolyte salt dissolved in the nonaqueous solvent, and, if necessary, an additive. The liquid nonaqueous solvent is made of, for example, a nonaqueous compound with an intrinsic viscosity of 10.0 mPa·s or less at 25° C. The nonaqueous solvent with an intrinsic viscosity of 10.0 mPa·s or less in a state that the electrolyte salt is dissolved therein may be used, and in the case where a plurality of kinds of nonaqueous compounds are mixed to form a solvent, the solvent may have an intrinsic viscosity of 10.0 mPa·s or less in a state that the compounds are mixed. As such a nonaqueous solvent, it is desired to use a mixed solvent including one kind or two or more kinds of a high dielectric constant solvent with a relatively high dielectric constant as a main solvent and one kind or two or more kinds of a low viscosity solvent.

Examples of the high dielectric constant solvent include ethylene carbonate, propylene carbonate, butylene carbonate, γ-butyrolactone, and valerolactones. Examples of the low viscosity solvent include acyclic carbonate having a symmetric structure such as diethyl carbonate or dimethyl carbonate, acyclic carbonate having an asymmetric structure such as methyl ethyl carbonate or methyl propyl carbonate, carboxylate such as methyl propionate or ethyl propionate, and phosphate such as trimethyl phosphate or triethyl phosphate.

Moreover, the nonaqueous solvent preferably includes vinylene carbonate, trifluoropropylene carbonate, 1,2-dimethoxyethane, 1,2-diethoxymethane, tetrahydrofuran, 2-methyltetrahydrofuran, 4-methyl-1,3-dioxolane, sulfolane, methylsulfolane, 2,4-difluoroanisole, 2,6-difluoroanisole or the like in addition to the high dielectric constant solvent and the low viscosity solvent, because battery characteristics can be improved. Further, their contents in the nonaqueous solvent are preferably 40% by volume or less, and more preferably 20% by volume or less.

Examples of the lithium salt include $LiPF_6$, $LiClO_4$, $LiAsF_6$, $LiBF_4$, $LiB(C_6H_5)_4$, $CH_3SO_3Li_1$, $CF_3SO_3Li$, $LiN(CF_3SO_2)_2$, $LiC(CF_3SO_2)_3$, $LiCl$ and $LiBr$, and one kind or a mixture including two or more kinds selected from them may be used. When a mixture including two or more kinds is used, $LiPF_6$ is preferably used as a main component, because $LiPF_6$ has high conductivity and superior oxidation stability.

The content (concentration) of the lithium salt in the solvent is preferably within a range of 0.5 mol/kg to 3.0 mol/kg. When the content is out of the range, there may be cases where sufficient battery characteristics cannot be obtained due to an extreme decline in ionic conductivity.

Instead of the electrolyte solution, a gel electrolyte in which a high molecular weight compound holds an electrolyte solution may be used. The components of the electrolyte solution (that is, a liquid solvent and an electrolyte salt) are as described above. Examples of the high molecular weight compound include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene and polycarbonate. Specifically, in terms of electrochemical stability, a high molecular weight compound having the structure of polyacrylonitrile, polyvinylidene fluoride, polyhexafluoropropylene or polyethylene oxide is preferably used. An amount of the high molecular weight compound added to the electrolyte solution varies depending upon compatibility between them; however, in general, an amount of the high molecular weight compound equivalent to 5% by mass to 50% by mass of the electrolyte solution is preferably added.

The secondary battery can be manufactured through the following steps, for example.

At first, for example, the cathode material capable of inserting and extracting lithium and the electrical conductor and the binder are mixed to prepare a cathode mixture, and the cathode mixture is dispersed in a solvent such as N-methyl-2-pyrrolidone to produce cathode mixture slurry. After the cathode mixture slurry is applied to the cathode current collector 21A, and is dried, the cathode mixture layer 21B is formed through compression molding so as to form the cathode 21.

Next, for example, the anode material capable of inserting and extracting lithium and the binder are mixed to prepare an anode mixture, then the anode mixture is dispersed in a solvent such as N-methyl-2-pyrrolidone to produce anode mixture slurry. After the anode mixture slurry is applied to the anode current collector 22A, and is dried, the anode mixture layer 22B is formed through compression molding so as to form the anode 22.

Then, the cathode lead 25 is attached to the cathode current collector 21A by welding or the like, and the anode lead 26 is attached to the anode current collector 22A by welding or the like. After that, for example, a laminate including the cathode 21 and the anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 is sandwiched between a pair of insulating plates 12 and 13, and then the spirally wound laminate is contained in the battery can 11. After the spirally wound laminate including the cathode 21 and the anode 22 is contained in the battery can 11, the electrolyte is injected into the battery can 11, and the separator 23 is impregnated with the electrolyte. After that, the battery cover 14, the safety valve mechanism 15 and the PTC device 16 are fixed in an opened end portion of the battery can 11 through caulking by the gasket 17. Thereby, the secondary battery shown in FIG. 1 is formed.

In the secondary battery, when charge is carried out, lithium ions are extracted from the cathode mixture layer 21B, and are inserted into the anode material capable of inserting and extracting lithium included in the anode mixture layer 22B through the electrolyte with which the separator 23 is impregnated. When the charge further continues, in a state where the open circuit voltage is lower than the overcharge voltage, the charge capacity exceeds the charge capacity of the anode material capable of inserting and extracting lithium, and then lithium metal begins to be precipitated on the surface of the anode material capable of inserting and extracting lithium. After that, until the charge is completed, precipitation of lithium metal on the anode 22 continues. Thereby, for example, when graphite is used as the anode material capable of inserting and extracting lithium, the color of the surface of the anode material layer 22B changes from black to gold, and then to silver.

At this time, the intensity ratio IB/IA of the carbon material included in the anode mixture layer 22 as an anode material capable of inserting and extracting lithium is 0.25 or more, so the precipitation of the lithium metal is adjusted, and as a result, a reaction between the lithium metal and the electrolyte and separation of the lithium metal from the carbon material can be prevented.

Next, when discharge is carried out, at first, the lithium metal precipitated on the anode 22 is eluted as ions, and is inserted into the cathode mixture layer 21B through the electrolyte with which the separator 23 is impregnated. When the discharge further continues, lithium ions inserted into the anode material capable of inserting and extracting lithium in the anode mixture layer 22B are extracted, and are inserted into the cathode mixture layer 21B through the electrolyte. Therefore, in the secondary battery, the characteristics of the conventional lithium secondary battery and the lithium-ion secondary battery, that is, a higher energy density and superior charge-discharge cycle characteristics can be obtained.

Thus, in the embodiment, the anode 22 includes the carbon material capable of obtaining the first peak within a range from 1580 $cm^{-1}$ to 1620 $cm^{-1}$ and the second peak within a range of 1350 $cm^{-1}$ to 1370 $cm^{-1}$ in a Raman spectrum analysis using argon laser light with a wavelength of 5145 nm, and having an intensity ratio IB/IA between the first peak and the second peak of 0.25 to 0.6, that is, the carbon material having a graphitic structure and a disordered structure at a predetermined ratio, so lithium ions can be sufficiently inserted into the anode 22 on the basis of the graphitic structure and the precipitation of the lithium metal can be adjusted on the basis of the disordered structure, so the reaction between the lithium metal and the electrolyte and the separation of the lithium metal from the carbon material can be prevented, and the precipitation-dissolution efficiency of the lithium metal, that is, charge-discharge efficiency can be improved. Therefore, a higher capacity can be obtained, and the charge-discharge cycle characteristics can be improved.

EXAMPLES

Further, specific examples of the invention will be described in detail below.

Examples 1-1 through 1-3

Cylindrical type secondary batteries as shown in FIG. 1 were formed. At first, lithium carbonate ($Li_2CO_3$) and cobalt carbonate ($CoCO_3$) were mixed at a ratio (molar ratio) of $Li_2CO_3:CoCO_3 = 0.5:1$, and the mixture was fired in air at 900° C. for 5 hours to obtain lithium cobalt complex oxide ($LiCoO_2$). When the X-ray diffraction of the obtained lithium cobalt complex oxide was measured, the diffraction pattern closely matched a peak of $LiCoO_2$ listed in the JCPDS file. Next, the lithium cobalt complex oxide was pulverized into the form of a powder with a particle diameter of 15 μm at 50% cumulative size which was obtained by a laser diffraction method to form a cathode active material.

Next, 95% by mass of a powder of the lithium cobalt complex oxide and 5% by mass of a powder of lithium carbonate were mixed to prepare a mixture, and then the 94% by mass of the mixture, 3% by mass of ketjen black as an electrical conductor and 3% by mass of polyvinylidene fluoride as a binder were mixed to prepare a cathode mixture. Next, the cathode mixture was dispersed in N-methyl-2-pyrrolidone as a solvent to produce cathode mixture slurry in paste form. After the cathode mixture slurry was uniformly applied to both sides of the cathode current collector 21A made of strip-shaped aluminum foil with a thickness of 20 μm, and was dried, the cathode mixture layer 21B was formed through compression molding so as to form the cathode 21 with the total thickness of 150 μm.

Moreover, 90% by mass of a powder of the carbon material as an anode active material and 10% by mass of polyvinylidene fluoride as a binder were mixed to prepare an anode mixture. As the carbon material, a powder of artificial graphite with the above intensity ratio IB/IA shown in Table 1 was used in each of Examples 1-1 through 1-3.

TABLE 1

|  | IB/IA | INITIAL DISCHARGE CAPACITY (mAh) | DISCHARGE CAPACITY RETENTION RATIO (%) |
|---|---|---|---|
| EXAMPLE 1-1 | 0.25 | 1221 | 88 |
| EXAMPLE 1-2 | 0.4 | 1218 | 88 |
| EXAMPLE 1-3 | 0.6 | 1215 | 89 |
| COMPARATIVE EXAMPLE 1-1 | 0.1 | 1220 | 63 |
| COMPARATIVE EXAMPLE 1-2 | 0.2 | 1220 | 71 |
| COMPARATIVE EXAMPLE 1-3 | 0.7 | 1180 | 82 |

Next, the anode mixture was dispersed in N-methyl-2-pyrrolidone as a solvent to form cathode mixture slurry in paste form. After the cathode mixture slurry was uniformly applied to both sides of the anode current collector 22A made of strip-shaped copper foil with a thickness of 15 μm, and was dried. Then, the anode mixture layer 22B was formed through compression molding so as to form the anode 22 with the total thickness of 160 μm. The capacity ratio in the facing surfaces of the cathode 21 and the anode 22 was the cathode capacity: the anode capacity=130:100.

After the cathode 21 and the anode 22 were formed, the separator 23 made of a stretched microporous polyethylene film with a thickness of 25 μm was disposed between the cathode 21 and the anode 22. A laminate including the anode 22, the separator 23, the cathode 21 and the separator 23 in this order was spirally wound several times to form the spirally wound electrode body 20 in a jelly roll form with an outside diameter of 14 mm.

Next, the spirally wound electrode body 20 was contained in the battery can 11 made of nickel-plated iron. At that time, the insulating plates 12 and 13 were disposed on the top side and the bottom side of the spirally wound electrode body 20. Then, the cathode lead 25 made of aluminum was drawn out from the cathode current collector 21A to be welded to the safety valve mechanism 15, and the anode lead 26 made of nickel was drawn out from the anode current collector 22A to be welded to the battery can 11. Next, the electrolyte solution was injected into the battery can 11 by a decompression method. As the electrolyte solution, a mixed solvent including the same volumes of ethylene carbonate and dimethyl carbonate in which a $LiPF_6$ content of 1.5 mol/dm$^3$ was dissolved was used.

As Comparative Examples 1-1 through 1-3 relative to Examples 1-1 through 1-3, secondary batteries were formed as in the case of Examples 1-1 through 1-3, except that as the carbon material, a powder of artificial graphite with the above intensity ratio IB/IA shown in Table 1 was used in each of Comparative Examples 1-1 through 1-3.

A charge-discharge test was carried out on the secondary batteries of Examples 1-1 through 1-3 and Comparative Examples 1-1 through 1-3 to determine their initial discharge capacities and their discharge capacity retention ratios. At that time, the secondary batteries were charged at a constant current of 1200 mA until a battery voltage reached 4.2 V, then charge was continued at a constant voltage of 4.2 V until the charging time reached 4 hours in total. The secondary batteries were discharged at a constant current of 1200 mA until the battery voltage reached 2.75 V. The discharge capacity retention ratio was determined as a ratio of a discharge capacity in the 100th cycle to a discharge capacity in the first cycle (the initial discharge capacity), that is, (the discharge capacity in the 100th cycle/the discharge capacity in the first cycle)×100. The results are shown in Table 1.

It was obvious from Table 1 that in Examples 1-1 through 1-3, the discharge capacity retention ratio was improved, compared to Comparative Examples 1-1 through 1-3. Moreover, the secondary batteries of Examples 1-1 through 1-3 could have a higher initial discharge capacity, that is, 1200 mAh or more.

In other words, it was found out that when the anode 22 included a carbon material with an intensity ratio IB/IA of 0.25 to 0.6, a higher capacity could be obtained, and the charge-discharge cycle characteristics could be improved.

Examples 2-1 through 2-6

Secondary batteries were formed as in the case of Examples 1-1 through 1-3, except that as the carbon material, a carbon material formed through covering natural graphite particles with coal tar pitch, and then firing them in an inert atmosphere at 1200° C. or less was used. In Examples 2-1 through 2-3, natural graphite particles with an intensity ratio IB/IA of 0.1 was used, and in Examples 2-4 through 2-6, natural graphite particles with an intensity ratio IB/IA of 0.2 was used. The intensity ratio IB/IA of the carbon material was changed in Examples 2-1 through 2-6 as shown in Table 2 or Table 3. Moreover, as Comparative Examples 2-1 and 2-2 relative to Examples 2-1 through 2-3, secondary batteries were formed as in the case of Examples 2-1 through 2-3, except that the intensity ratio IB/IA of the carbon material was changed as shown in Table 2. Further, as Comparative Example 2-3 relative to Examples 2-4 through 2-6, a secondary battery was formed as in the case of Examples 2-4 through 2-6, except that the intensity ratio IB/IA of the carbon material was changed as shown in Table 3.

TABLE 2

|  | IB/IA | | INITIAL DISCHARGE CAPACITY (mAh) | DISCHARGE CAPACITY RETENTION RATIO (%) |
|---|---|---|---|---|
|  | BEFORE COVERING (NATURAL GRAPHITE PARTICLES) | AFTER COVERING | | |
| EXAMPLE 2-1 | 0.1 | 0.25 | 1222 | 88 |
| EXAMPLE 2-2 | 0.1 | 0.4 | 1222 | 89 |
| EXAMPLE 2-3 | 0.1 | 0.6 | 1220 | 88 |
| COMPARATIVE EXAMPLE 1-1 | 0.1 | NO COVERING | 1220 | 63 |
| COMPARATIVE EXAMPLE 2-1 | 0.1 | 0.2 | 1221 | 68 |

TABLE 2-continued

| | IB/IA | | | |
|---|---|---|---|---|
| | BEFORE COVERING (NATURAL GRAPHITE PARTICLES) | AFTER COVERING | INITIAL DISCHARGE CAPACITY (mAh) | DISCHARGE CAPACITY RETENTION RATIO (%) |
| COMPARATIVE EXAMPLE 2-2 | 0.1 | 0.7 | 1210 | 82 |

TABLE 3

| | IB/IA | | | |
|---|---|---|---|---|
| | BEFORE COVERING (NATURAL GRAPHITE PARTICLES) | AFTER COVERING | INITIAL DISCHARGE CAPACITY (mAh) | DISCHARGE CAPACITY RETENTION RATIO (%) |
| EXAMPLE 2-4 | 0.2 | 0.25 | 1220 | 88 |
| EXAMPLE 2-5 | 0.2 | 0.4 | 1221 | 89 |
| EXAMPLE 2-6 | 0.2 | 0.6 | 1221 | 88 |
| COMPARATIVE EXAMPLE 1-2 | 0.2 | NO COVERING | 1220 | 71 |
| COMPARATIVE EXAMPLE 2-3 | 0.2 | 0.7 | 1205 | 82 |

The initial discharge capacities and the discharge capacity retention ratios of the secondary batteries of Examples 2-1 through 2-6 and Comparative Examples 2-1 through 2-3 were determined as in the case of Examples 1-1 through 1-3. The results are shown in Table 2 and Table 3 together with the results of Comparative Examples 1-1 and 1-2.

It was obvious from Table 2 and Table 3 that in Examples 2-1 through 2-6, the discharge capacity retention ratio was improved, compared to Comparative Examples 1-1,1-2, and 2-1 through 2-3. Moreover, the secondary batteries of Examples 2-1 through 2-6 could have a higher initial discharge capacity, that is, 1200 mAh or more.

In other words, it was found out that even if the anode 22 included a carbon material including a high crystalline layer with an intensity ratio IB/IA of less than 0.25 and a low crystalline layer with an intensity ratio IB/IA of 0.25 or more with which the high crystalline layer was covered, the charge-discharge cycle characteristics could be improved.

Examples 3-1 through 3-9

Figure 3:
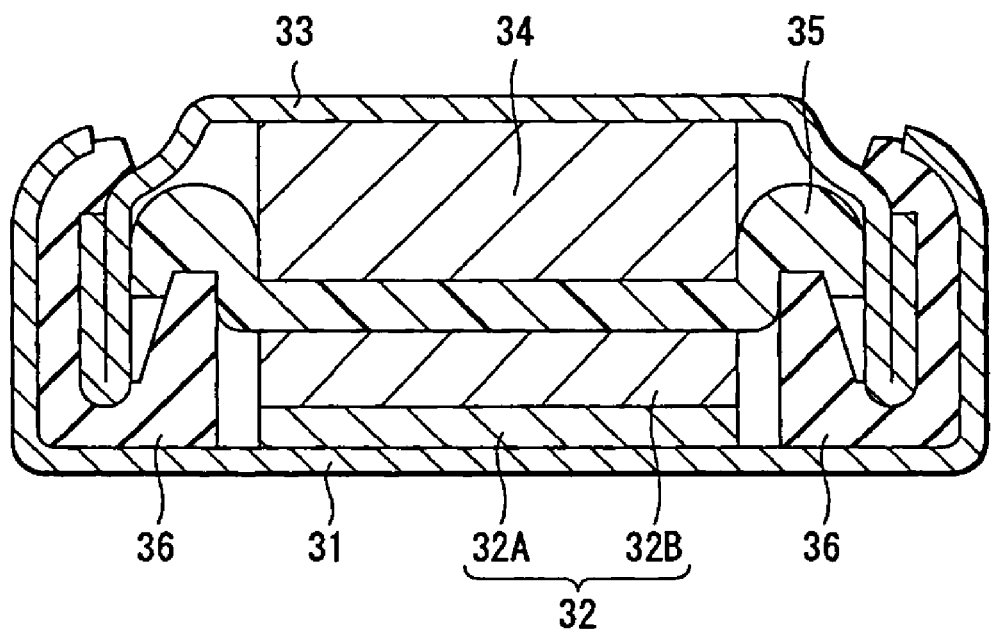
FIG. 3 is a sectional view of a cell for evaluation formed in Examples 3-1 through 3-9 and Comparative Examples 3-1 through 3-6 of the invention.

As each of Examples 3-1 through 3-9 and Comparative Examples 3-1 through 3-6, an anode including a carbon material was used in a so-called coin cell for evaluation shown in FIG. 3 to evaluate the characteristics of the anode. The cell for evaluation comprised a laminate including an anode 32 contained in a package can 31 and a lithium metal plate 34 contained in a package cup 33 with a separator 35 in between, and an electrolyte solution was injected so that the separator 35 was impregnated with the electrolyte solution.

At first, an anode mixture layer 32B was formed on an anode current collector 32A. At that time, the anode mixture layer 32B was formed as in the case of Examples 1-1 through 1-3 and 2-1 through 2-6, except that as the anode active material, powders of the same carbon materials as those in Examples 1-1 through 1-3 for Examples 3-1 through 3-3, powders of the same carbon materials as those in Examples 2-1 through 2-6 for Examples 3-4 through 3-9, powders of the same carbon materials as those in Comparative Examples 1-1 through 1-3 for Comparative Examples 3-1 through 3-3, respectively, and powders of the same carbon materials as those in Comparative Examples 2-1 through 2-3 for Comparative Examples 3-4 through 3-6, respectively, were used. Next, the anode current collector 32A on which the anode mixture layer 32B was formed was cut out in a circle shape with a diameter of 15 mm to form the anode 32 with a total thickness of 80 μm.

Next, the separator 35 was placed on the package cup 33 onto which the lithium metal plate 34 was crimped, and the electrolyte solution was injected onto the separator 35, and the package can 31 containing the anode 32 was put on the package cup 33. After that, the peripheral portions of the package cup 33 and the package can 31 were caulked by a gasket 36. As the package can 31 and the package cup 33, a stainless steel sheet formed by a drawing process was used, and as the separator 35, a porous polyethylene film with a thickness of 25 μm and a porosity of 35% was used, and as the gasket 36, a gasket made of a polypropylene resin was used. As the electrolyte solution, a mixed solvent including the same volumes of ethylene carbonate and dimethyl carbonate in which a $LiPF_6$ content of 1.5 $mol/dm^3$ was dissolved was used. The cell for evaluation had a diameter of 20 mm and a height of 2.5 mm.

The characteristics of the anode 32 were evaluated through the following steps. A charge-discharge test was carried out on the formed cells to insert and precipitate lithium into/on the anode 32 and extract and dissolve lithium from the anode 32. The insertion of lithium into the anode 32 and the precipitation of lithium on the anode 32, that is, the charge of the anode 32 and the discharge of the cell for evaluation were carried out at a constant current. More specifically, a current of 1 mA was passed through the anode 32 until the charge capacity of a graphite electrode reached 600 $mAh/cm^3$. The extraction and dissolution of lithium from the anode 32, that is, the discharge of the anode 32 and the charge of the cell for evaluation were carried out at a constant current. More specifically, a current of 1 mA was passed through the anode 32 until a terminal voltage reached 1.5 V with respect to the lithium metal plate 34. As a result, in Examples 3-1 through 3-9 and Comparative Examples 3-1 through 3-6, charge-discharge curves shown in FIG. 4 were obtained.

Figure 4:
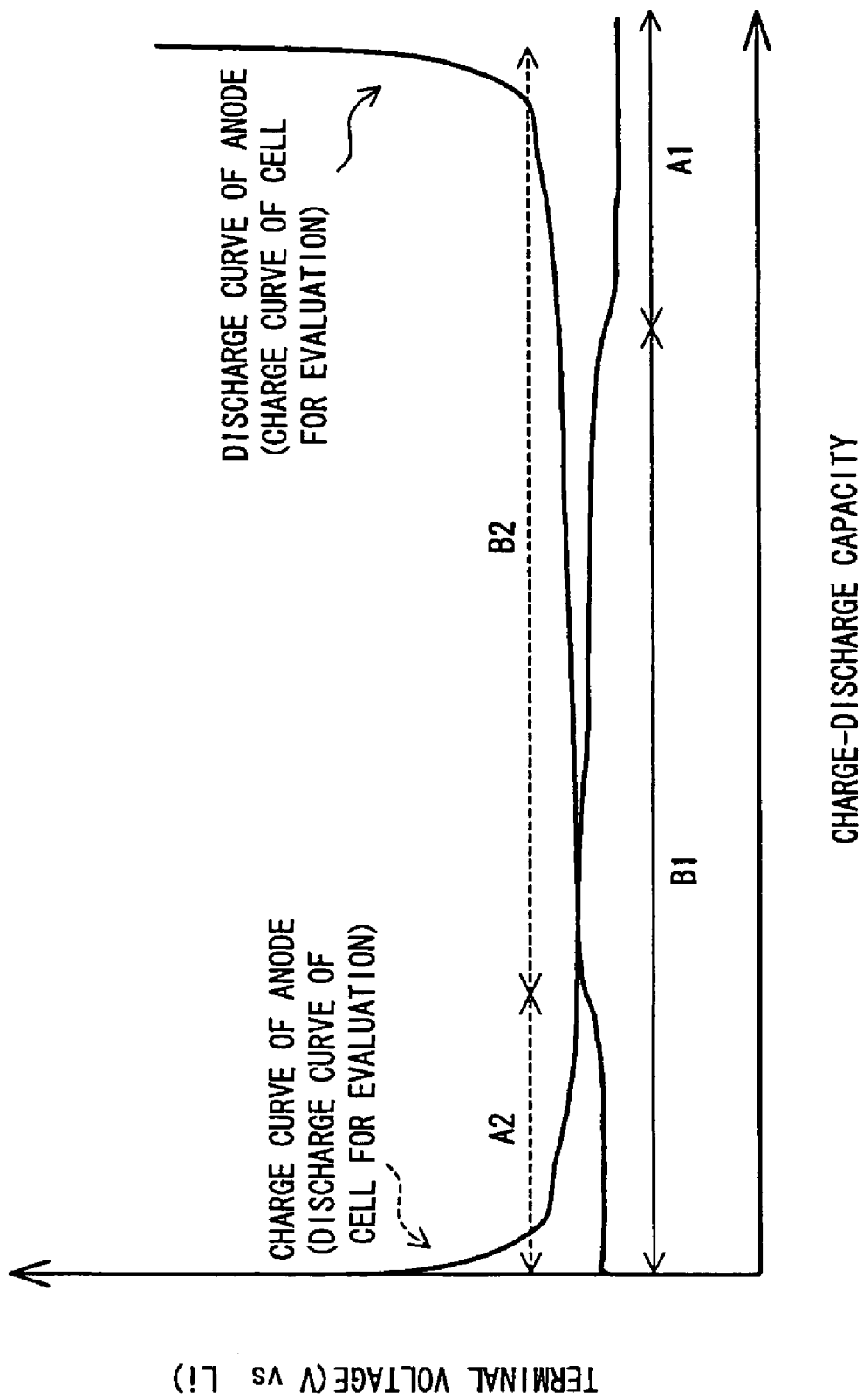
FIG. 4 is a plot showing charge-discharge curves according to Examples 3-1 through 3-9 and Comparative Examples 3-1 through 3-6 of the invention.

In FIG. 4, a region A1 of a charge curve of the anode 32 (a discharge curve of the cell for evaluation), a region A2 of a discharge curve of the anode 32 (a charge curve of the cell for evaluation), a region B1 of the charge curve of the anode 32 (the discharge curve of the cell for evaluation) and a region B2 of the discharge curve of the anode 32 (the charge curve of the cell for evaluation) correspond to "a precipitation reaction of lithium metal on the carbon material", "a dissolution reaction of lithium metal on the carbon material", "an insertion reaction of lithium metal into the carbon material" and "an extraction reaction of lithium metal from the carbon material", respectively. In other words, it was confirmed that in the cells for evaluation of Examples 3-1 through 3-9 and Comparative Examples 3-1 through 3-6, the capacity of the anode 32 included a capacity component by insertion and extraction of lithium and a capacity component by precipitation and dissolution of lithium, and was represented by the sum of them.

Moreover, charge-discharge efficiency (precipitation-dissolution efficiency) of lithium metal in each of the cells for evaluation of Examples 3-1 through 3-9 and Comparative Examples 3-1 through 3-6 was determined from the charge-discharge curves as charge-discharge efficiency of lithium metal=(a capacity based on a dissolution reaction of lithium metal)/(a capacity based on a precipitation reaction of lithium metal)×100. The results are shown in Tables 4 through 6.

TABLE 4

|  | IB/IA | INITIAL Li METAL CHARGE-DISCHARGE EFFICIENCY (%) |
|---|---|---|
| EXAMPLE 3-1 | 0.25 | 94 |
| EXAMPLE 3-2 | 0.4 | 94 |
| EXAMPLE 3-3 | 0.6 | 93 |
| COMPARATIVE EXAMPLE 3-1 | 0.1 | 87 |
| COMPARATIVE EXAMPLE 3-2 | 0.2 | 88 |
| COMPARATIVE EXAMPLE 3-3 | 0.7 | 90 |

TABLE 5

|  | IB/IA | | INITIAL Li METAL CHARGE-DISCHARGE EFFICIENCY (%) |
|---|---|---|---|
|  | BEFORE COVERING (NATURAL GRAPHITE PARTICLES) | AFTER COVERING | |
| EXAMPLE 3-4 | 0.1 | 0.25 | 94 |
| EXAMPLE 3-5 | 0.1 | 0.4 | 94 |
| EXAMPLE 3-6 | 0.1 | 0.6 | 93 |
| COMPARATIVE EXAMPLE 3-1 | 0.1 | NO COVERING | 87 |
| COMPARATIVE EXAMPLE 3-4 | 0.1 | 0.2 | 88 |
| COMPARATIVE EXAMPLE 3-5 | 0.1 | 0.7 | 90 |

TABLE 6

|  | IB/IA | | INITIAL Li METAL CHARGE-DISCHARGE EFFICIENCY (%) |
|---|---|---|---|
|  | BEFORE COVERING (NATURAL GRAPHITE PARTICLES) | AFTER COVERING | |
| EXAMPLE 3-7 | 0.2 | 0.25 | 94 |
| EXAMPLE 3-8 | 0.2 | 0.4 | 94 |
| EXAMPLE 3-9 | 0.2 | 0.6 | 93 |
| COMPARATIVE EXAMPLE 3-2 | 0.2 | NO COVERING | 88 |
| COMPARATIVE EXAMPLE 3-6 | 0.2 | 0.7 | 90 |

It was obvious from Tables 4 through 6 that there was a tendency that as the intensity ratio IB/IA increased, the charge-discharge efficiency of lithium metal increased to a maximum value, then decreased. Moreover, in Examples 3-1 through 3-9 in which the intensity ratio IB/IA of the carbon material was 0.25 to 0.6, the charge-discharge efficiency of lithium metal could be higher than 90%. In other words, it was found out that in a battery in which the capacity of the anode 32 included a capacity component by insertion and extraction of lithium and a capacity component by precipitation and dissolution of lithium, and was represented by the sum of them, when a carbon material with an intensity ratio IB/IA of 0.25 to 0.6 was used, the charge-discharge efficiency of lithium metal could be improved, thereby the charge-discharge efficiency of the battery could be improved.

Although the present invention is described referring to the embodiment and examples, the invention is not specifically limited to them, and is variously modified. For example, in the embodiment and the examples, the case where lithium is used as the light metal is described; however, the invention is applicable to the case where any other Group 1 element in the long form of the periodic table of the elements such as sodium (Na) or potassium (K), a Group 2 element in the long form of the periodic table of the elements such as magnesium or calcium (Ca), any other light metal such as aluminum, lithium or an alloy thereof is used, thereby the same effects can be obtained. In this case, the anode material capable of inserting and extracting light metal, the cathode material, the nonaqueous solvent or the like is selected depending upon the used light metal.

However, lithium or an alloy including lithium is preferably used as the light metal, because voltage compatibility with lithium-ion secondary batteries which are practically used at present is high. Further, when the alloy including lithium is used as the light metal, a material capable of forming an alloy with lithium may be present in the electrolyte so as to form an alloy during precipitation.

Further, in the embodiment and the examples, the case where the electrolyte solution or the gel electrolyte which is a kind of solid electrolyte is used is described; however, any other electrolyte may be used. Examples of the electrolyte include a mixture of an ionic conducting inorganic compound such as ionic conducting ceramic, ionic conducting glass or ionic crystal and an electrolyte solution, a mixture of the ionic conducting inorganic compound and a gel electrolyte or a mixture of the ionic conducting inorganic compound and a solid high molecular weight electrolyte formed through dispersing an electrolyte salt in a high molecular weight compound having ionic conductivity.

Moreover, in the embodiment and the examples, the structure of the secondary battery is described referring to some examples; however, the invention can be applied to a battery with any other structure. For example, in the embodiment and the examples, the cylindrical type or coin type secondary battery is described; however, the invention is applicable to a secondary battery with a button shape, a prismatic shape or the like. In addition, the invention is applicable to not only the secondary batteries but also primary batteries.

Obviously many modifications and variations of the present invention are possible in the light of the above teachings. It is therefore to be understood that within the scope of the appended claims the invention may be practiced otherwise than as specifically described.

What is claimed is:

1. A battery, comprising: a cathode; an anode; and an electrolyte,
   wherein the capacity of the anode includes a capacity component by insertion and extraction of light metal and a capacity component by precipitation and dissolution of the light metal, and is represented by the sum of them, and
   the anode includes a dual-layer carbon material obtaining a first peak within a range from 1580 $cm^{-1}$ to 1620 $cm^{-1}$ and a second peak within a range of 1350 cm$^{-1}$ to 1370 cm$^{-1}$ in a Raman spectrum analysis using argon laser light with a wavelength of 5145 nm, and the dual-layer carbon material having an average intensity ratio IB/IA between the first peak and the second peak of 0.25 to 0.6, where the intensity of the first peak is IA and the intensity of the second peak is IB, wherein one of the dual-layer carbon layers includes a high crystalline layer with an intensity ratio IB/IA of less than 0.25 and another of the dual-layer carbon layers includes a low crystalline layer with an intensity ratio IB/IA of 0.25 or more.

2. A battery according to claim 1, wherein the first peak is based on a graphitic structure and the second peak is based on a disordered structure.

3. The battery according to claim 1, wherein the disordered structure exists on at least a surface of a carbon material.

4. The battery according to claim 1, wherein the low crystalline layer is formed on a surface of the high crystalline layer.

5. The battery according to claim 1, wherein the cathode is lithium complex oxide.

6. The battery according to claim 1, wherein the light metal is precipitated on the anode in a state where the open circuit voltage is lower than the overcharge voltage.

7. The battery according to claim 1, wherein when the open circuit voltage of the battery is below overcharging voltages, the maximum capacity of the lithium metal precipitated on the anode is from 0.05 times to 3.0 times larger than the charge capacity of the anode material capable of inserting and extracting lithium.

8. The battery according to claim 1, wherein lithium precipitates on the negative electrode when the open circuit voltage of the battery is at least 0 V and at most 4.2 V.

9. The battery according to claim 1, wherein the battery exhibits a discharge capacity retention ratio of at least 88%, measured as a ratio of a discharge capacity in a 100$^{th}$ charge cycle to a discharge capacity in the first charge cycle.

10. The battery according to claim 7, wherein the battery exhibits a discharge capacity retention ratio of at least 88%, measured as a ratio of a discharge capacity in a 100$^{th}$ charge cycle to a discharge capacity in the first charge cycle.

11. The battery according to claim 9, wherein the battery exhibits a discharge capacity retention ratio of at least 93%.

12. The battery according to claim 10, wherein the battery exhibits a discharge capacity retention ratio of at least 93%.

* * * * *